(12) United States Patent
Chikkanayakanahally et al.

(10) Patent No.: US 10,379,960 B1
(45) Date of Patent: Aug. 13, 2019

(54) BYPASSING BACKUP OPERATIONS FOR SPECIFIED DATABASE TYPES

(71) Applicant: EMC Corporation, Hopkinton, MA (US)

(72) Inventors: Manjesh Chikkanayakanahally, Bangalore (IN); Elango Chockalingam, Bangalore (IN); Krishnendu Bagchi, Bangalore (IN); Challa Dharmateja, Bangalore (IN); Amarendra Behera, Bangalore (IN); Sunil Kumar Yadav, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 382 days.

(21) Appl. No.: 15/191,992

(22) Filed: Jun. 24, 2016

(51) Int. Cl.
*G06F 16/30* (2019.01)
*G06F 11/14* (2006.01)
*H04L 29/08* (2006.01)
*G06F 16/23* (2019.01)

(52) U.S. Cl.
CPC ...... *G06F 11/1451* (2013.01); *G06F 16/2358* (2019.01); *H04L 67/34* (2013.01)

(58) Field of Classification Search
None
See application file for complete search history.

(56) References Cited

U.S. PATENT DOCUMENTS

| | | | | |
|---|---|---|---|---|
| 8,055,614 B1* | 11/2011 | Vaikar | | G06F 11/1448 707/610 |
| 9,165,001 B1* | 10/2015 | Upadhyay | | G06F 17/30079 |
| 9,448,893 B1* | 9/2016 | Whitehead | | G06F 17/30144 |
| 2009/0327630 A1* | 12/2009 | Akamatsu | | G06F 11/1451 711/162 |
| 2014/0108352 A1* | 4/2014 | Ahrens | | G06F 17/30174 707/645 |
| 2015/0081639 A1* | 3/2015 | Jin | | G06F 11/1451 707/644 |
| 2017/0011049 A1* | 1/2017 | Venkatesh | | G06F 17/30073 |

* cited by examiner

*Primary Examiner* — Tarek Chbouki

(74) *Attorney, Agent, or Firm* — Dergosits & Noah LLP; Todd A. Noah

(57) ABSTRACT

Bypassing backup operations for specified database types is described. A system determines whether a database, of multiple databases associated with a database system, corresponds to a database type specified in a configuration file, in response to receiving a backup operation request. The system executes an incremental backup operation on changes made to the database since a selected time, for the backup operation request, if the database does not correspond to the database type specified in the configuration file. The system bypasses executing any backup operation on the database for the backup operation request if the database corresponds to the database type specified in the configuration file.

20 Claims, 3 Drawing Sheets

US 10,379,960 B1

BYPASSING BACKUP OPERATIONS FOR SPECIFIED DATABASE TYPES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Figure 1:
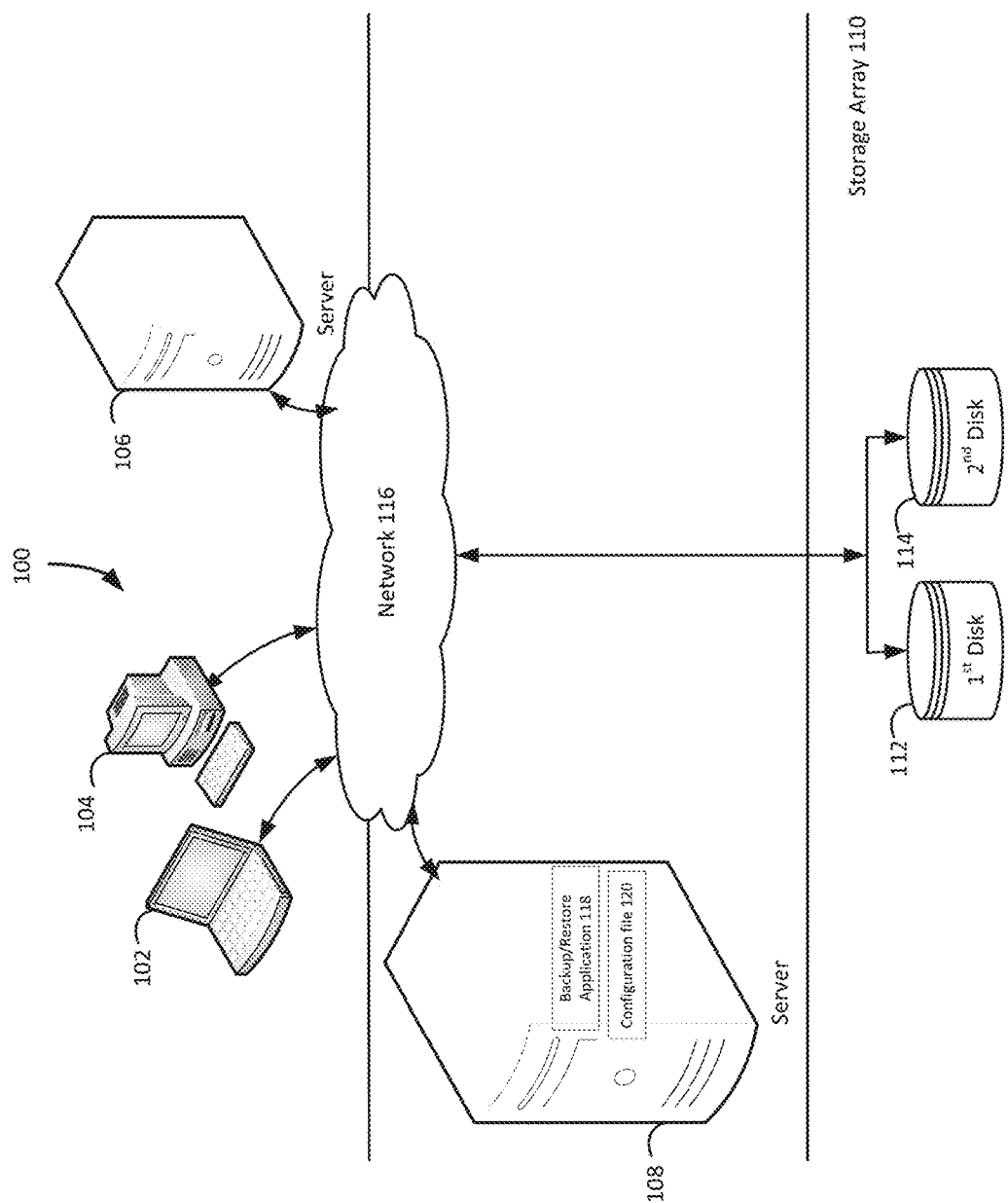
FIG. 1 illustrates a block diagram of an example system for bypassing backup operations for specified database types, under an embodiment.

Some backup/restore applications support multiple data object recovery models, such as a full recovery model and a simple recovery model. A full recovery model supports both a full backup operation on all of a data object and an incremental backup operation on only changes made to the data object since a selected time, such as a previous backup of the data object. In contrast, a simple recovery model supports only a full backup operation on all of a data object because the simple recovery model does not maintain transaction logs that record changes made to the data object since a selected time, such as a previous backup of the data object. When a backup/restore application is preparing to execute an incremental backup operation on a data object, the backup/restore application may identify that the data object is a simple recovery model data object. In response to identifying a simple recovery model data object, the backup/restore application may change the incremental backup operation on only changes to the simple recovery model data object into a full backup operation on all of the simple recovery model data object to insure that any potential changes to the simple recovery model data object are backed up. However, not even a single change may have been made to the simple recovery model data object, such that performing a full backup operation on this simple recovery model data object is not necessary. The unnecessary performance of the full backup operation can result in degradation of the backup/restore application's performance and the unintentional wasting of time and system resources such as backup storage space.

Embodiments herein bypass backup operations for specified database types. A system determines whether a database, of multiple databases associated with a database system, corresponds to a database type specified in a configuration file, in response to receiving a backup operation request. The system executes an incremental backup operation on changes made to the database since a selected time, for the backup operation request, if the database does not correspond to the database type specified in the configuration file. The system bypasses executing any backup operation on the database for the backup operation request if the database corresponds to the database type specified in the configuration file.

For example, a backup/restore application responds to a backup operation request, based on an hourly incremental backup schedule, by determining if the $3^{rd}$ of 25 SQL databases stored by a SQL server is a simple recovery model database specified by a system user in a configuration file. If the $3^{rd}$ SQL database is not a simple recovery model database, then the backup/restore application executes an incremental backup operation on changes made to the $3^{rd}$ SQL database since the most recent backup of the $3^{rd}$ SQL database. If the $3^{rd}$ SQL database is a simple recovery model database, then the backup/restore application does not execute any backup operation, either an incremental backup operation or a full backup operation, on the $3^{rd}$ SQL database for the currently pending backup operation request. Therefore, the backup/restore application improves the backup performance for database systems with a significant number of simple recovery model databases by preventing frequent and unnecessary full backups of simple recovery model databases, without requiring the addition of another backup/restore application or the addition of another backup storage space. The backup/restore application provides a system administrator with the flexibility to select a different backup schedule for simple recovery model databases without disturbing the currently scheduled backups. For example, the backup/restore application may subsequently execute a full backup operation on the $3^{rd}$ SQL database based on a midnight schedule, thereby insuring that the $3^{rd}$ SQL database is backed up on a daily basis.

FIG. 1 illustrates a diagram of a system that bypasses backup operations for specified database types, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108, and a storage array 110 that may be provided by a hosting company. Although FIG. 1 depicts the first client 102 as a laptop computer 102, the second client 104 as a personal computer 104, and the third client 106 as a database server 106, each of the clients 102-106 may be any type of computer. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 300 depicted in FIG. 3 and described below.

The server 108, which may be referred to as a backup server 108, includes a backup/restore application 118 that can use a configuration file 120 to create backup files of data objects for the clients 102-106, and execute a rollback based on the backup files. The backup/restore application 118 may provide centralized administration, such as scheduling, monitoring, and managing backup operations and backup files. The backup/restore application 118 can enable the storing of backup operation schedules, client policies, and client configurations. The backup/restore application 118 may provide a unique interface to the clients 102-106 during login, and assist the backup server 108 in authenticating and registering the clients 102-106. The backup/restore application 118 can send backup/restore work orders to the clients 102-106, which may receive and process the work orders to start a backup or restore operation. The backup/restore application 118 maintains a local database of all processes that execute on the backup server 108. The backup/restore application 118 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 118 residing completely on the backup server 108, the backup/restore application 118 may reside in any combination of partially on the backup server 108 and partially on the clients 102-106, such as by residing as data management applications on the clients 102-106. Even though the following paragraphs describe EMC Corporation's Avamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 118 can receive a configuration file from a system user. For example, the backup/restore application 118 receives the configuration file 120, which includes a parameter that specifies the bypassing of incremental backup operations on simple recovery model databases, from a system administrator. The configuration file 120 may also specify the backup server 108, user credentials for the clients 102-106, the clients 102-106 to be backed up, and the instance levels for the backups. After receiving a configuration file, the backup/restore application 118 can receive a backup operation request. For example, the backup/restore application 118 receives a backup operation request based on an hourly incremental backup schedule. Although this example describes a backup operation request based on an hourly incremental backup schedule, the backup operation request may be based on any time period, any time, and any type of backup.

Having received the backup operation request, the backup/restore application 118 determines whether a database, of multiple databases associated with a database system, corresponds to a database type specified in the configuration file 120. For example, the backup/restore application 118 responds to the backup operation request, based on the hourly incremental backup schedule, by determining if the $3^{rd}$ of 25 SQL databases stored by the SQL server 106 is a simple recovery model database specified by a system user in the configuration file 120. Although this example describes a database system that includes 25 databases, the database system may include any number of databases. While this example describes the backup/restore application 118 determining whether a SQL database is a specified type of database, the backup/restore application 118 may determine whether any type of database or any type of data object is a specified type of database or a specified type of data object. In this example, the backup/restore application 118 is determining if the $3^{rd}$ SQL database in stored in the SQL server 106 is a simple recovery model database because the backup/restore application 118 had already executed incremental backup operations on the $1^{st}$ SQL database and the $2^{nd}$ SQL database stored in the SQL server 106, which the backup/restore application 118 had already determined were not simple recovery model databases.

If the database does not correspond to the database type specified in the configuration file 120, the backup/restore application 118 executes an incremental backup operation on changes made to the database since a selected time, for the backup operation request. For example, the backup/restore application 118 executes an incremental backup operation on changes made to the $3^{rd}$ SQL database since the most recent backup of the $3^{rd}$ SQL database because the $3^{rd}$ SQL database is not a simple recovery model database. While this example describes the backup/restore application 118 executing a backup operation on a SQL database that is not the specified type of database, the backup/restore application 118 may execute a backup operation on any type of database or any type of data object that is not the specified type of database or the specified type of data object.

If the database corresponds to the database type specified in the configuration file 120, the backup/restore application 118 bypasses executing any backup operation on the database for the backup operation request. "Bypassing" a backup operation on a database means that the currently pending backup operation is not performed on the database that matches a specified database type. For example, the backup/restore application 118 does not execute any backup operation, either an incremental backup operation or a full backup operation, on the $3^{rd}$ SQL database for the currently pending backup operation request because the $3^{rd}$ SQL database is a simple recovery model database. While this example describes the backup/restore application 118 bypassing execution of a backup operation on a SQL database that is the specified type of database, the backup/restore application 118 may bypass executing a backup operation on any type of database or any type of data object that is the specified type of database or the specified type of data object.

After the backup/restore application 118 either executes or bypasses execution of a backup operation on a database, the backup/restore application 118 makes similar determinations for any other databases in the database system for which such a determination was not already made for the currently pending backup operation request. For example, the backup/restore application 118 next responds to the backup operation request, based on the hourly incremental backup schedule, by determining if the $4^{th}$ of 25 SQL databases stored by the SQL server 106 is a simple recovery model database specified by the system user in the configuration file 120. Therefore, the backup/restore application 118 improves the backup performance for database systems with a significant number of simple recovery model databases by preventing frequent and unnecessary full backups of simple recovery model databases, without requiring the addition of another backup/restore application 118 or the addition of another backup storage space.

Having processed the backup operation request, the backup/restore application 118 can receive another backup operation request. For example, the backup/restore application 118 receives a request to execute a full backup operation on the $3^{rd}$ SQL database, based on a midnight schedule. After receiving the other backup operation request, the backup/restore application 118 can execute a full backup operation on the database. For example, the backup/restore application 118 executes a full backup operation on the $3^{rd}$ SQL database based on the midnight schedule, thereby insuring that the $3^{rd}$ SQL database is backed up on a daily basis. This example describes executing a full backup operation on the $3^{rd}$ SQL database regardless of whether or not the $3^{rd}$ SQL database is a simple recovery model database because recoveries based on periodic full backups of databases may be more efficient that recoveries based on a single full backup followed by a significant number of incremental backups. The backup/restore application 118 provides a system administrator with the flexibility to select a different backup schedule for simple recovery model databases without disturbing the currently scheduled backups.

Figure 2:
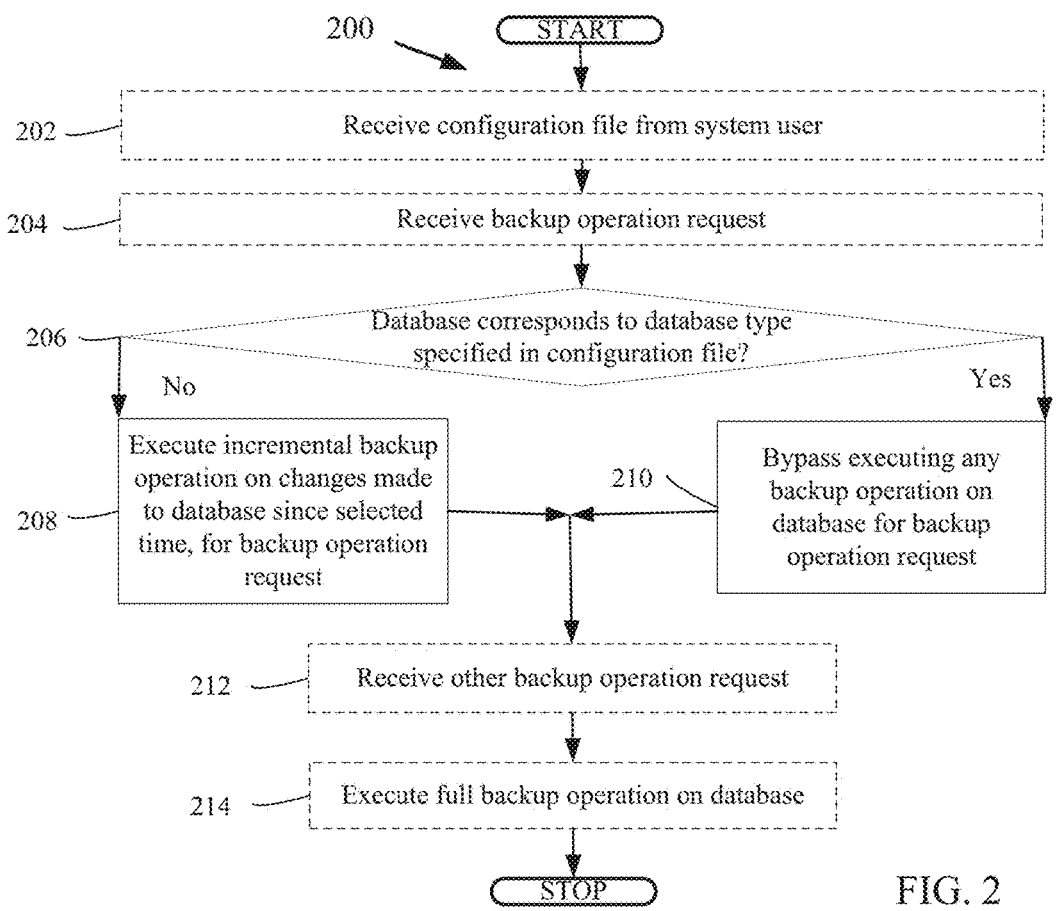
FIG. 2 is a flowchart that illustrates a method of bypassing backup operations for specified database types, under an embodiment.

FIG. 2 is a flowchart that illustrates a method for bypassing backup operations for specified database types, under an embodiment. Flowchart 200 illustrates method acts illustrated as flowchart blocks for certain steps involved in and/or between the clients 102-106 and/or the server 108 of FIG. 1.

A system optionally receives a configuration file from a system user, block 202. For example, the backup/restore application 118 receives the configuration file 120, specifying the bypassing of incremental backup operations on simple recovery model databases, from a system administrator.

After receiving the configuration file, the system optionally receives a backup operation request, block 204. For example, the backup/restore application 118 receives a backup operation request based on an hourly incremental backup schedule.

Having received the backup operation request, the system determines whether a database, of multiple databases associated with a database system, corresponds to a database type specified in a configuration file, block 206. For example, the backup/restore application 118 responds to the backup operation request, based on the hourly incremental backup schedule, by determining if the $3^{rd}$ of 25 SQL databases stored by the SQL server 106 is a simple recovery model database specified by the system user in the configuration file 120. If the database does not correspond to the database type specified in a configuration file, the flowchart 200 continues to block 208 to execute the backup operation on the database for the backup operation request. If the database corresponds to the database type specified in a configuration file, the flowchart 200 proceeds to block 210 to bypass any backup operation on the database for the currently pending backup operation request.

If the database does not correspond to the database type specified in a configuration file, the system executes an incremental backup operation on changes made to the database since a selected time, for the backup operation request, block 208. For example, the backup/restore application 118 executes an incremental backup operation on changes made to the $3^{rd}$ SQL database since the most recent backup of the $3^{rd}$ SQL database because the $3^{rd}$ SQL database is not a simple recovery model database. Then the flowchart 200 proceeds to block 212.

If the database corresponds to the database type specified in a configuration file, the system bypasses executing any backup operation on the database for the currently pending backup operation request, block 210. For example, the backup/restore application 118 does not execute any backup operation, either an incremental backup operation or a full backup operation, on the $3^{rd}$ SQL database for the currently pending backup operation request because the $3^{rd}$ SQL database is a simple recovery model database.

Having processed the backup operation request, the system optionally receives another backup operation request, block 212. For example, the backup/restore application 118 receives a request to execute a full backup operation on the $3^{rd}$ SQL database, based on a midnight schedule.

After receiving the other backup operation request, the system optionally executes a full backup operation on the database, block 214. For example, the backup/restore application 118 executes a full backup operation on the $3^{rd}$ SQL database based on the midnight schedule, thereby insuring that the $3^{rd}$ SQL database is backed up on a daily basis.

Although FIG. 2 depicts the blocks 202-214 occurring in a specific order, the blocks 202-214 may occur in another order. In other implementations, each of the blocks 202-214 may also be executed in combination with other blocks and/or some blocks may be divided into a different set of blocks.

Figure 3:
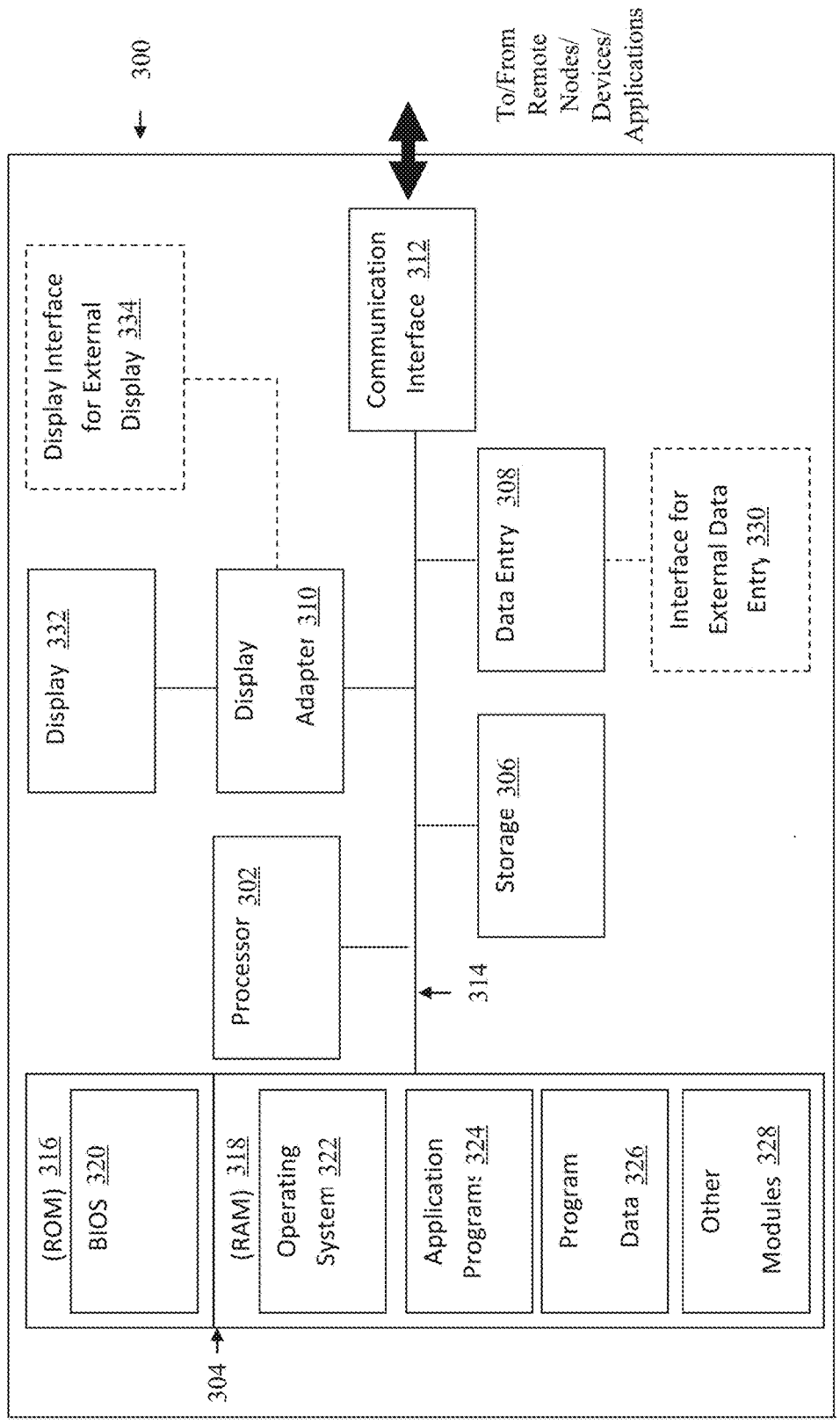
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for bypassing backup operations for specified database types, the system comprising:
   one or more processors; and
   a non-transitory computer readable medium storing a plurality of instructions, which when executed, cause the one or more processors to:
   determine whether a database, of a plurality of databases associated with a database system, corresponds to a database type specified in a configuration file, in response to receiving a backup operation request, the database type indicating a lack of a transaction log for the database, and the backup operation configured to perform a full backup operation if changes to the database since a previous backup cannot be determined;
   execute an incremental backup operation on changes made to the database since a selected time, for the backup operation request, in response to a determination that the database does not correspond to the database type specified in the configuration file; and
   bypass executing any backup operation on the database for the backup operation request in response to a determination that the database corresponds to the database type specified in the configuration file.

2. The system of claim 1, wherein the plurality of instructions, when executed, further causes the processors to receive the configuration file from a system user.

3. The system of claim 1, wherein the selected time is associated with a previous backup operation executed on the database.

4. The system of claim 1, wherein the plurality of instructions, when executed, further causes the processors to execute the full backup operation on the database in response to receiving a subsequent backup operation request.

5. The system of claim 4, wherein the subsequent backup operation request is based on a full backup schedule.

6. The system of claim 5, wherein the full backup operation is executed on the database in response to a determination the subsequent backup operation request is based on the full backup schedule instead of an incremental backup schedule.

7. The system of claim 1, wherein the backup operation request is based on an incremental backup schedule.

8. The system of claim 7, wherein bypassing executing any backup operation on the database for the backup operation is performed without modifying the incremental backup schedule of the backup operation request.

9. The system of claim 1, wherein the backup operation is further configured to perform the full backup operation if changes to the database cannot be determined as a result of the database being implemented using a simple recovery model.

10. A computer-implemented method for bypassing backup operations for specified database types, the method comprising:
   determining whether a database, of a plurality of databases associated with a database system, corresponds to a database type specified in a configuration file, in response to receiving a backup operation request, the database type indicating a lack of a transaction log for the database, and the backup operation configured to perform a full backup operation if changes to the database since a previous backup cannot be determined;
   executing an incremental backup operation on changes made to the database since a selected time, for the backup operation request, in response to a determination that the database does not correspond to the database type specified in the configuration file; and
   bypassing executing any backup operation on the database for the backup operation request in response to a determination that the database corresponds to the database type specified in the configuration file.

11. The method of claim 10, wherein the method further comprises receiving the configuration file from a system user.

12. The method of claim 10, wherein the selected time is associated with a previous backup operation executed on the database.

13. The method of claim 10, wherein the method further comprises executing the full backup operation on the database in response to receiving a subsequent backup operation request.

14. The method of claim 13, wherein the subsequent backup operation request is based on a full backup schedule.

15. The method of claim 10, wherein the backup operation request is based on an incremental backup schedule.

16. A computer program product, comprising a non-transitory computer-readable medium having a computer-readable program code embodied therein to be executed by one or more processors, the program code including instructions to:
   determine whether a database, of a plurality of databases associated with a database system, corresponds to a database type specified in a configuration file, in response to receiving a backup operation request, the database type indicating a lack of a transaction log for the database, and the backup operation configured to perform a full backup operation if changes to the database since a previous backup cannot be determined;
   execute an incremental backup operation on changes made to the database since a selected time, for the backup operation request, in response to a determination that the database does not correspond to the database type specified in the configuration file; and
   bypass executing any backup operation on the database for the backup operation request in response to a determination that the database corresponds to the database type specified in the configuration file.

17. The computer program product of claim 16, wherein the program code includes further instructions to receive the configuration file from a system user.

18. The computer program product of claim 16, wherein the selected time is associated with a previous backup operation executed on the database.

19. The computer program product of claim 16, wherein the program code includes further instructions to execute the full backup operation on the database in response to receiving a subsequent backup operation request.

20. The computer program product of claim 19, wherein the backup operation request is based on an incremental backup schedule, and the subsequent backup operation request is based on a full backup schedule.

* * * * *